(12) United States Patent
Romain et al.

(10) Patent No.: US 6,581,084 B1
(45) Date of Patent: Jun. 17, 2003

(54) CIRCUIT FOR MULTIPLICATION IN A GALOIS FIELD

(75) Inventors: Fabrice Romain, Aix en Provence (FR); Guy Monier, Rognac (FR); Marie-Noëlle Lepareux, Paris (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/483,343

(22) Filed: Jan. 14, 2000

(30) Foreign Application Priority Data

Jan. 15, 1999 (FR) .............................. 99 00472

(51) Int. Cl.$^7$ .............................. G06F 7/72
(52) U.S. Cl. ..................... 708/492
(58) Field of Search ........................ 708/492

(56) References Cited

U.S. PATENT DOCUMENTS

| | | | | |
|---|---|---|---|---|
| 4,797,848 A | * | 1/1989 | Walby | 708/491 |
| 6,138,134 A | * | 10/2000 | Matsuo | 708/492 |
| 6,151,939 A | * | 11/2000 | Jeong | 380/265 |
| 6,230,179 B1 | * | 5/2001 | Dworkin et al. | 708/492 |
| 6,349,318 B1 | * | 2/2002 | Vanstone et al. | 708/492 |

FOREIGN PATENT DOCUMENTS

| | | |
|---|---|---|
| DE | 19644688 A | 4/1998 |
| WO | WO 98 48345 | 10/1998 |

\* cited by examiner

*Primary Examiner*—David H. Malzahn
(74) *Attorney, Agent, or Firm*—Lisa K. Jorgenson; Stephen Bongini; Fleit, Kain, Gibbons, Gutman & Bongini P.L.

(57) ABSTRACT

A multiplication circuit with an accumulator is provided. The multiplication circuit includes first latch circuits, second latch circuits, and elementary adders that are cascade-coupled to one another in series through the first latch circuits. Each of the adders has its carry output coupled to one of its inputs through one of the second latch circuits. Additionally, cancellation circuitry cancels the contents of each of the second latch circuits at least during selected multiplication operations so as to carry out multiplication operations in a Galois field. In some preferred embodiments, the cancellation circuitry includes a logic gate that receives a selection signal indicating the mode of operation, and the logic gate sets and holds the second latch circuits at zero when the selection signal indicates that the multiplication operation is to be done in a Galois field. In other preferred embodiments, the cancellation circuitry includes logic gates that are each associated with a pair formed by one of the adders and the associated second latch circuit. Also provided is a method for performing a multiplication operation in a Galois field using a multiplication circuit with an accumulator.

18 Claims, 2 Drawing Sheets

US 6,581,084 B1

CIRCUIT FOR MULTIPLICATION IN A GALOIS FIELD

CROSS-REFERENCE TO RELATED APPLICATIONS

This application is based upon and claims priority from prior French Patent Application No. 99-00472, filed Jan. 15, 1999, the entire disclosure of which is herein incorporated by reference.

BACKGROUND OF THE INVENTION

1. Field of the Invention

The present invention relates to circuits for multiplication in a Galois field, and more specifically to a multiplication circuit for performing multiplication operations in the $GF(2^n)$ Galois field generated by a generator polynomial.

2. Description of Related Art

Galois fields are finite sets of elements on which the mathematical operations are defined differently. The Galois field $GF(2^n)$ is a field having N elements, with $N=2^n$. One representation of this field is the polynomial representation. All of the elements are written in the form of an n–1 degree polynomial:

$$a_{n-1}X^{n-1} + a_{n-2}X^{n-2} + \ldots + a_2X^2 + a_1X + a_0$$

with $a_1$ being a coefficient belonging to GF(2) and therefore being equal to either "0" or "1". Consequently, each element can be likened to a number encoded on n bits.

The computations performed on the different elements correspond to computations made on polynomials reduced by an irreducible $n^{th}$ degree polynomial. The computations done on the numbers encoded on eight bits representing the elements of the field operate differently than the conventional operations. In particular, the addition of two elements is done bit-by-bit using an XOR circuit. The subtraction is done identically to the addition. The multiplication is done in two steps. In a first step, a multiplication similar to a normal multiplication is done, and then in a second step, a reduction is done using a generator polynomial.

Galois fields are used in digital transmission to generate either error correction codes or encryption codes. Among the encryption codes, there is the encryption known as elliptic curve encryption. This type of encryption uses binary numbers encoded on a large number of bits (typically, 100 to 200 bits). The computation circuits that are currently used for performing operations in Galois fields are conventional processors, possibly coupled with dedicated circuits. When a conventional processor is used, it is hard to optimize the computation time. On the other hand, dedicated circuits takes up more space and consumes more energy.

SUMMARY OF THE INVENTION

In view of these drawbacks, it is an object of the present invention to overcome the above-mentioned drawbacks and to integrate a specific multiplication circuit in a standard processor without substantially increasing the size of the processor.

Another object of the present invention is to provide an accumulation multiplication circuit that enables multiplication operations to be performed both conventionally and in Galois fields.

One embodiment of the present invention provides a multiplication circuit with an accumulator. The multiplication circuit includes first latch circuits, second latch circuits, and elementary adders that are cascade-coupled to one another in series through the first latch circuits. Each of the adders has its carry output coupled to one of its inputs through one of the second latch circuits. Additionally, the multiplication circuit includes cancellation circuitry for canceling the contents of each of the second latch circuits at least during selected multiplication operations so as to carry out multiplication operations in a Galois field. In some preferred embodiments, the cancellation circuitry includes a logic gate that receives a selection signal indicating the mode of operation, and the logic gate sets and holds the second latch circuits at zero when the selection signal indicates that the multiplication operation is to be done in a Galois field. In other preferred embodiments, the cancellation circuitry includes logic gates that are each associated with a pair formed by one of the adders and the associated second latch circuit.

Another embodiment of the present invention provides a method for performing a multiplication operation in a Galois field using a multiplication circuit with an accumulator. The multiplication circuit includes elementary adders that are cascade-coupled to one another in series through first latch circuits. According to the method, for each adder, a carry output of the adder is coupled to one of the inputs of the adder through a second latch circuit. The carry value stored in each of the second latch circuits is canceled when carrying out a multiplication operation in a Galois field.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
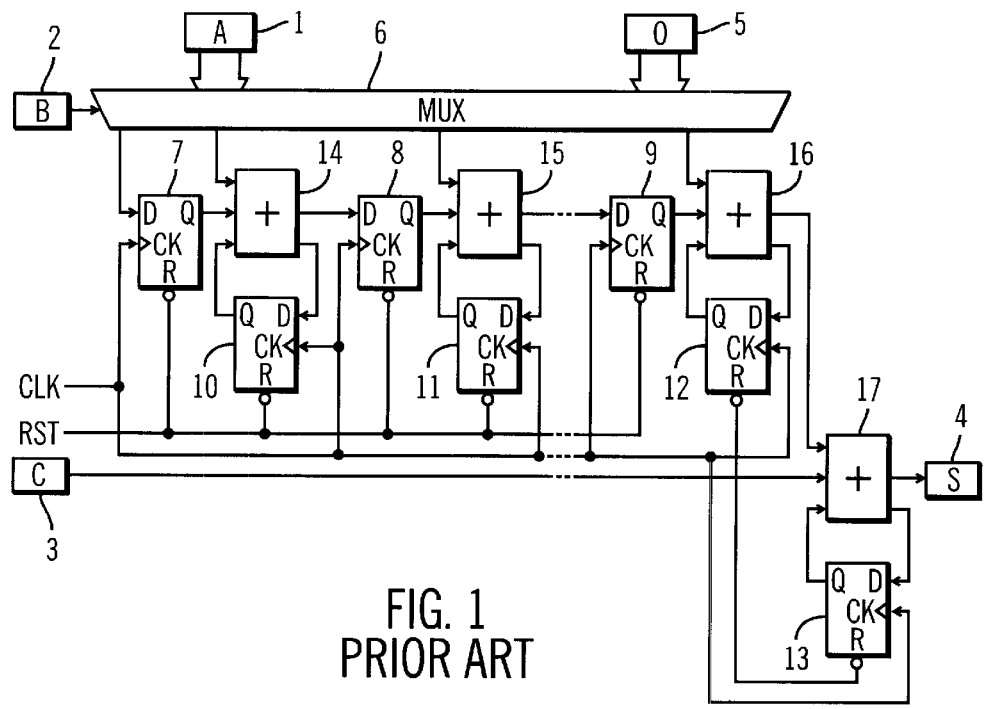
FIG. 1 shows a conventional multiplication circuit with an accumulator.

FIG. 1 shows a conventional multiplication circuit with an accumulator (or series multiplication circuit). This circuit is generally used in conventional processors because it makes it possible to have a small multiplication circuit. The multiplication circuit includes a first n-bit register 1 with parallel output, second and third n-bit shift registers 2 and 3 with series outputs, a fourth 2*n-bit shift register 4 with series input, and a fifth n-bit register 5 with parallel output. The first n-bit register 1 contains first data A, the second n-bit shift register 2 contains second data B, the third n-bit shift register 3 contains third data C, the fourth 2*n-bit shift register 4 receives the result S, and the fifth n-bit register 5 contains zero encoded on n bits.

A multiplexer 6 has first and second n-bit parallel inputs, one selection input, and one n-bit parallel output. The first input is connected to the output of the first register 1, the second input is connected to the output of the fifth register 5, and the selection input is connected to the output of the second register 2. Additionally, first to $(n-1)^{th}$ accumulation latch circuits 7 to 9 (e.g., D-type latch circuits) and first to $n^{th}$ carry latch circuits 10 to 13 (e.g., D-type) each have a data input, a clock input, a zero-setting/holding input, and an output. The data input of the first accumulation latch circuit 7 is connected to the most significant bit of the parallel output of the multiplexer 6.

The clock inputs of all of the accumulation latch circuits 7 to 9 and carry latch circuits 10 to 13 are connected together to receive the same clock signal CLK, and the setting/holding inputs of all of the accumulation latch circuits 7 to 9 and carry latch circuits 10 to 13 are connected together to receive the same resetting signal RST. Further, first to $n^{th}$ standard adders (or complete adders) 14 to 17 each have first to third inputs, a result output, and a carry output. The first inputs of the first to $(n-1)^{th}$ adders 14 to 16 are connected to the multiplexer 6 to receive the n−2 to 0 bits, and the second inputs of the first to $(n-1)^{th}$ adders 14 to 16 are connected to the outputs of the first to $(n-1)^{th}$ accumulation latch circuits 7 to 9.

The first input of the $n^{th}$ adder 17 is connected to the result output of the $(n-1)^{th}$ adder 16, and the second input of the $n^{th}$ adder 17 is connected to the output of the third register 3. The third inputs of the first to $n^{th}$ adders 14 to 17 are connected to the outputs of the first to $n^{th}$ carry latch circuits 10 to 13, and the result outputs of the first to $(n-2)^{th}$ adders 14 to 15 are connected to the data inputs of the second to $(n-1)^{th}$ accumulation latch circuits 8 to 9. The result output of the $n^{th}$ adder 17 is connected to the input of the fourth register 4, and the carry outputs of the first to $n^{th}$ adders 14 to 17 are connected to the data inputs of the first to $n^{th}$ carry latch circuits 10 to 13. Typically, the first to fourth registers 1 to 4 also have parallel inputs and/or outputs for exchanging data with other parts of the processor. These inputs and/or outputs are not shown in the drawings for clarity.

Numerous alternative embodiments of the circuit of FIG. 1 are possible. For example, the fifth register 5 and the multiplexer 6 can be replaced by a series of logic gates that fulfil the same function but are smaller. Additionally, the third register 3 enables the performance of a further addition with the result of the multiplication (e.g., when a multiplication is made on numbers whose size is greater than the capacity of the multiplication circuit), and some lesser performing variants of the circuit do not include the third register. Further, other variants of the circuit enable the cascade connection of two (or more) multiplication circuits. For this purpose, a full adder and an additional carry latch circuit are added upstream (with respect to the first accumulation latch circuit) to receive data from another identical circuit.

The adders 14 to 17, the accumulation latch circuits 7 to 9, and the carry latch circuits 10 to 13 form a conventional accumulator circuit that operates in a relatively simple manner. Either the first data A or zero and the contents of the carry latch circuits 10 to 13 are successively added to the contents of the accumulation latch circuits 7 to 9. The word contained in the accumulation latch circuits 7 to 9 is successively shifted. Before beginning a computation, the first and second data A and B, which are to be multiplied, are loaded into the first and second registers 1 and 2, respectively.

If it is desired to simultaneously perform an addition, then the third data C, which is to be added, is loaded into the third register 3. If not, the third register 3 is set at zero. All of the accumulation and carry latch circuits 7 to 13 are reset, and the multiplication is done in two steps. In a first step, which lasts n cycles of the clock signal CLK, at each cycle second and third data B and C of the second and third registers 2 and 3 are shifted by one bit. If the bit output from the second register 2 is equal to "1", then the multiplexer 6 delivers the first data A at its output. If the bit output from the second register 2 is equal to "0", then the multiplexer 6 delivers zero at its output.

Thus, at each cycle of the clock signal CLK, either zero or the first data A and a carry word are added to the contents of the accumulation latch circuits 7 to 9, and the contents of the accumulation latch circuits 7 to 9 are themselves shifted by one bit. Thus, a bit of the result S is stored in the fourth register 4 during each cycle, and a new carry word is stored in the carry latch circuits 10 to 13 for use during the following cycle. In a second step, which also lasts n cycles of the clock signal, "0"s are delivered at the output of the second and third registers in order to output the complement of the result still contained in the accumulation latch circuits 7 to 9.

If the second data B is encoded on more than n bits, it is possible to carry out the first step several times by changing the contents of the second register between each performance of the first step. If the first and second data A and B are encoded on more than n bits, a first multiplication of the second data B by the least significant word of the first data A is performed. Then, a second multiplication of the second data B with a more significant word of the first data A is performed while at the same time adding the bits of the previous result S, except for the least significant bits that are already important for the final result. Between each performance of the first step, the word of the second data B and the word of the third data C must be changed. Further details on the operation of the conventional circuit of FIG. 1 are available from various technical manuals.

In accordance with the present invention, the circuit of FIG. 1 is converted to allow it to perform multiplication operations in a Galois field defined by a generator polynomial. To obtain this result, each pair formed by an adder and a carry latch circuit must be replaced by an XOR-type gate. However, if an XOR gate in parallel and a multiplexer are merely added to choose the mode of operation of the multiplication circuit, the size of the circuit is greatly increased. Instead, preferred embodiments of the present invention cancel the looping of the carry value of each adder.

Figure 2:
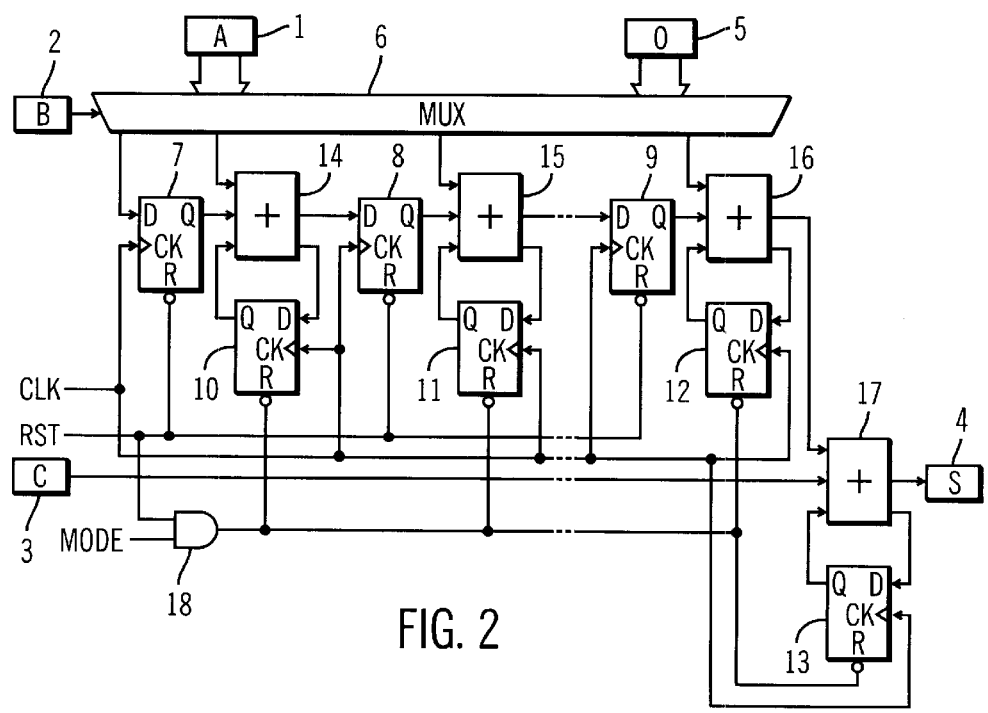
FIG. 2 shows a multiplication circuit according to a first embodiment of the present invention.

FIG. 2 shows a first embodiment of a multiplication circuit that is simple to implement. In particular, the extra cost of this embodiment in terms of surface area of the component is limited to just one logic gate. In FIG. 2, elements corresponding to identical elements in FIG. 1 have the same reference numerals. The embodiment of FIG. 2 has an additional logic gate 18 with two inputs and one output. In the illustrated embodiment, the gate is an AND-type gate 18 having one input that receives the resetting signal RST and another input that receives a selection signal. MODE for indicating the mode of operation. The resetting inputs of the first to $n^{th}$ carry latch circuits 10 to 13 are connected to the output of the logic gate 18, instead of directly receiving the resetting signal.

The operation of the circuit of FIG. 2 is similar to the operation of the circuit of FIG. 1. In particular, if it is desired to perform a classic multiplication, the selection signal MODE is set to logic level "one" and the multiplication is done in the manner explained above. If, on the contrary, it is desired to carry out the multiplication on the Galois field, then the selection signal MODE is set to logic level "zero". This has the effect of setting and holding all the carry latch circuits at "zero", with the running of a multiplication operation being done as a standard multiplication.

The holding at "zero" of the selection signal MODE has the effect of permanently canceling the carry value by setting and holding at "zero". However, in this device, high consumption is generated at each active edge of the clock signal CLK. Indeed, at each active edge, the latch circuit will carry out a storage operation while at the same time being set and held at zero. If the carry value to be stored is a logic "one", then complementary transistors will be in a state of simultaneous conduction for a short duration that leads to excess consumption by the circuit.

A simple technique to avoid such high consumption is to not keep the selection signal permanently active. It is enough to send a pulse after each active edge of the clock signal to cancel the stored carry value. For example, such a mechanism can be realized by using a pulse generator that is activated on the inactive edges of the clock signal. The setting/holding is then done at each cycle of the clock signal instead of being permanent.

Figure 3:
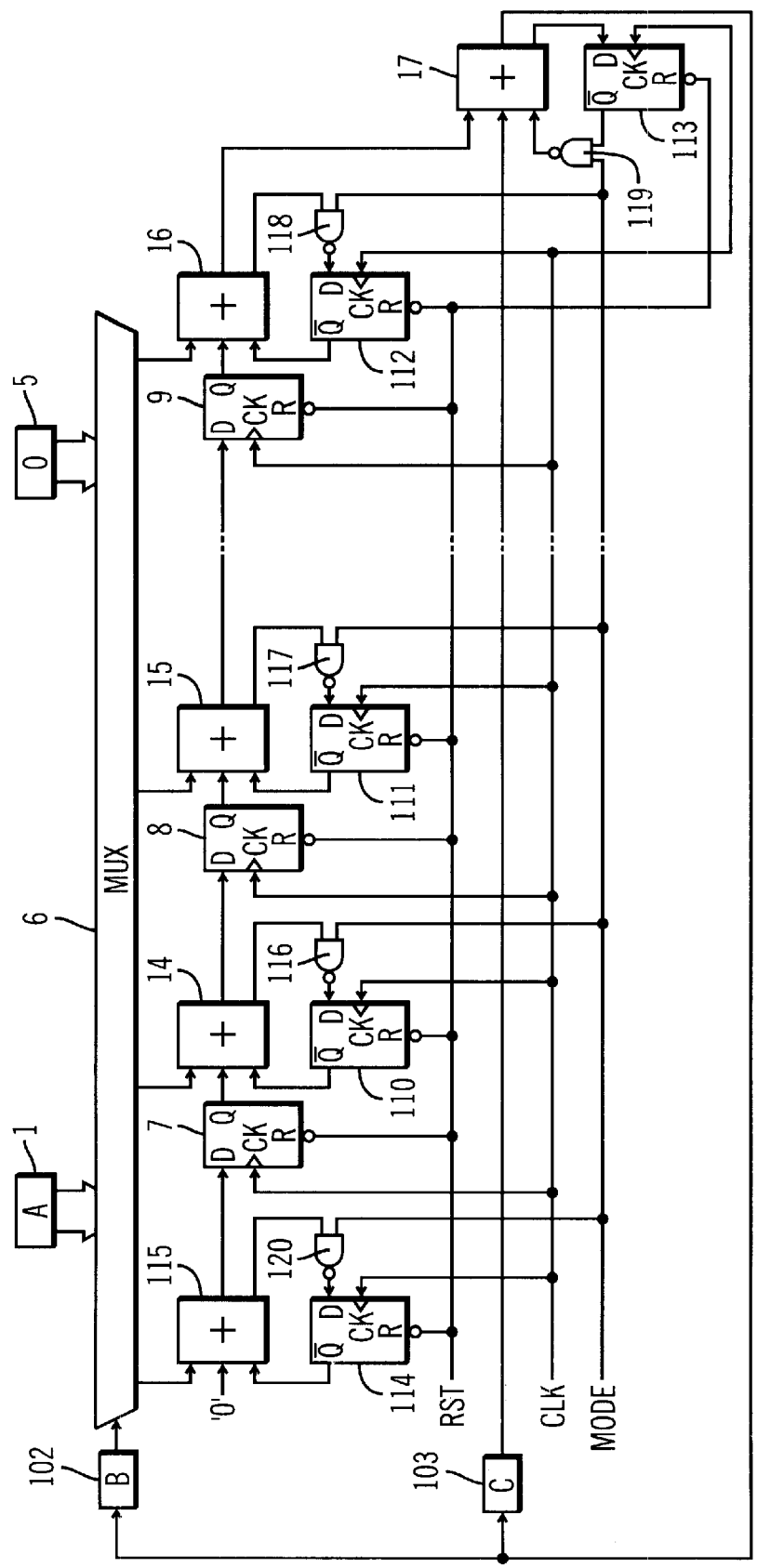
FIG. 3 shows a multiplication circuit according to a second embodiment of the present invention.

FIG. 3 shows a multiplication circuit according to a second embodiment of the present invention. The embodiment shown in FIG. 3 is slightly more complex in terms of surface area of the integrated circuit, but has limited consumption. In FIG. 3, elements corresponding to identical elements in FIGS. 1 and 2 have the same reference numerals. In the multiplication circuit of FIG. 3, the second to fourth registers 2 to 4 have been replaced by second and third n-bit registers 102 and 103 having a series input connected to the result output of the $n^{th}$ adder 17. This enables an economy of 2*n latch circuits but slightly complicates the working of the circuit.

This modification enables the storage of the result S in the second and third registers as soon as the data of these registers is used. Multiplexers (not shown) are necessary at the input and/or output of these registers in order to prevent the reintroduction of the results stored in the registers when these registers have to give zeros. Further, the first to $n^{th}$ carry latch circuits 10 to 13 are replaced by first to $n^{th}$ carry latch circuits 110 to 113 having an inverter output instead of a normal output. An $(n+1)^{th}$ carry latch circuit 114 and an $(n+1)^{th}$ elementary adder 115 have also been added. A first input of the $(n+1)^{th}$ adder 115 is connected to the multiplexer 6, instead of the first accumulation latch circuit 7. A result output of the $(n+1)^{th}$ adder 115 is connected to the data input of the first accumulation latch circuit 7.

A second input of the $(n+1)^{th}$ adder 115 receives a logic "zero". A third input of the $(n+1)^{th}$ adder 115 is connected to the output of the $(n+1)^{th}$ carry latch circuit 114. A clock input of the $(n+1)^{th}$ carry latch circuit 114 receives the clock signal CLK. A setting/holding input of the $(n+1)^{th}$ carry latch circuit 114 receives the resetting signal RST. The adding of the $(n+1)^{th}$ carry latch circuit 114 and of the $(n+1)^{th}$ adder 115 enables a cascade connection of the multiplication circuit. It is enough to connect the output of another multiplication circuit to the second input of the $(n+1)^{th}$ adder 115, with the "zero" having to be received at the second input when the multiplication circuit is used alone.

First to $(n+1)^{th}$ logic gates 116 to 120 are respectively associated with the first to $(n+1)^{th}$ carry latch circuits 110 to 114. The logic gates 116 to 120 are of the NAND-type with first and second inputs and one output. The first inputs of the first to $(n-1)^{th}$ and $(n+1)^{th}$ logic gates 116 to 118 and 120 are respectively connected to the carry outputs of the first to $(n-1)^{th}$ and $(n+1)^{th}$ adders 14 to 16 and 115. The first input of the $n^{th}$ logic gate 119 is connected to the output of the $n^{th}$ carry latch circuit 113. The second inputs of the first to $(n+1)^{th}$ logic gates 116 to 120 are connected together and receive the selection signal MODE. The outputs of the first to $(n-1)^{th}$ and $(n+1)^{th}$ logic gates 116 to 118 and 120 are respectively connected to the data inputs of the first to $(n-1)^{th}$ and $(n+1)^{th}$ carry latch circuits 110 to 112 and 114. The output of the $n^{th}$ logic gate 119 is connected to the third input of the $n^{th}$ adder 117.

The first to $(n+1)^{th}$ logic gates 116 to 120 cancel the carry on the loop path of each adder 14 to 17 and 115. These logic gates 116 to 120 may, without distinction, be placed at the input or output of each of the carry latch circuits 110 to 114. In the preferred embodiment shown in FIG. 3, the logic gates 116 to 120 are NAND-type gates because these are the smallest and the fastest in CMOS technology. The use of inverter gates leads to the use of output inverters on the carry latch circuits. If the gates used are non-inverters, it is preferable to use carry latch circuits with non-inverter outputs.

The operation of the circuit of FIG. 3 is similar to the operation of the circuit of FIG. 2. The selection signal MODE validates the operation in a standard multiplication circuit when it is at logic level "one", and it validates the operation of the multiplication circuit in a Galois field when it is at logic level "zero". The difference in operation between the circuits of FIGS. 2 and 3 lies essentially in the implementation of the cancellation of the carry value. In the circuit of FIG. 3, the carry value is canceled on the loop path of the carry value by a logic gate whose static consumption is almost zero. Because there is neither any permanent setting and holding nor any generation of a cyclical setting and holding signal, the consumption of the circuit of FIG. 3 is far smaller than the consumption of the circuit of FIG. 2.

While there has been illustrated and described what are presently considered to be the preferred embodiments of the present invention, it will be understood by those skilled in the art that various other modifications may be made, and equivalents may be substituted, without departing from the true scope of the present invention. For example, the logic levels used in the embodiments of the present invention described above could easily be changed by one of ordinary skill in the art, with the gates and latch circuits being modified accordingly. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A multiplication circuit with an accumulator, said multiplication circuit comprising:

a plurality of first latch circuits;

a plurality of second latch circuits;

a plurality of elementary adders each having a result output and a carry output, the adders being cascade-coupled to one another in series through the first latch circuits, each of the adders having its carry output coupled to one of its inputs through one of the second latch circuits; and cancellation circuitry for canceling the contents of each of the second latch circuits at least during selected multiplication operations so as to carry out multiplication operations in a Galois field.

2. The circuit as defined in claim 1, wherein the cancellation circuitry includes a logic gate that receives a selection signal indicating the mode of operation in which the multiplication circuit is to operate.

3. The circuit as defined in claim 2, wherein when the selection signal indicates that the multiplication operation is to be done in a Galois field, the logic gate sets and holds the second latch circuits at zero.

4. The circuit as defined in claim 1, wherein the cancellation circuitry includes a plurality of logic gates, each of the logic gates being associated with a pair formed by one of the adders and the associated second latch circuit.

5. The circuit as defined in claim 4, wherein each of the logic gates is coupled between the carry output of one of the adders and an input of the associated second latch circuit.

6. The circuit as defined in claim 5, wherein the logic gates are inverters and the outputs of the second latch circuits are inverter outputs.

7. The circuit as defined in claim 4, wherein the logic gates are inverters and the outputs of the second latch circuits are inverter outputs.

8. The circuit as defined in claim 1, wherein the adders are three-input adders.

9. A processor having a computation circuit with an accumulator, said computation circuit comprising:

a plurality of first latch circuits;

a plurality of second latch circuits;

a plurality of elementary adders each having a result output and a carry output, the adders being cascade-coupled to one another in series through the first latch circuits, each of the adders having its carry output coupled to one of its inputs through one of the second latch circuits; and cancellation circuitry for canceling the contents of each of the second latch circuits at least during selected multiplication operations so as to carry out multiplication operations in a Galois field.

10. The processor as defined in claim 9, wherein the cancellation circuitry includes a logic gate that receives a selection signal indicating the mode of operation in which the computation circuit is to operate.

11. The processor as defined in claim 10, wherein when the selection signal indicates that the multiplication operation is to be done in a Galois field, the logic gate sets and holds the second latch circuits at zero.

12. The processor as defined in claim 9, wherein the cancellation circuitry includes a plurality of logic gates, each of the logic gates being associated with a pair formed by one of the adders and the associated second latch circuit.

13. The processor as defined in claim 12, wherein each of the logic gates is coupled between the carry output of one of the adders and an input of the associated second latch circuit.

14. The processor as defined in claim 12, wherein the logic gates are inverters and the outputs of the second latch circuits are inverter outputs.

15. A method for performing a multiplication operation in a Galois field using a multiplication circuit with an accumulator, the multiplication circuit including a plurality of elementary adders that are cascade-coupled to one another in series through a plurality of first latch circuits, said method comprising the steps of:

for each adder, coupling a carry output of the adder to one of the inputs of the adder through one of a plurality of second latch circuits; and canceling the carry value stored in each of the second latch circuits when carrying out a multiplication operation in a Galois field.

16. The method as defined in claim 15, wherein in the canceling step, the stored carry values are canceled by setting and holding each of the second latch circuits at zero.

17. The method as defined in claim 16, wherein in the canceling step, each of the second latch circuits is set and held at zero at each cycle of a clock signal.

18. The method as defined in claim 15, wherein in the canceling step, each of the stored carry values is canceled through a logic gate that is coupled between the corresponding adder and the associated second latch circuit.

* * * * *